Patented May 27, 1924.

1,495,350

UNITED STATES PATENT OFFICE.

JOHN MERRILL OLIN, OF ALTON, ILLINOIS, ASSIGNOR, BY MESNE ASSIGNMENTS, TO WESTERN CARTRIDGE COMPANY, A CORPORATION OF DELAWARE.

PRIMING COMPOSITION.

No Drawing. Application filed June 29, 1921. Serial No. 481,358.

*To all whom it may concern:*

Be it known that I, JOHN MERRILL OLIN, a citizen of the United States, residing at Alton, in the county of Madison, State of Illinois, have invented certain new and useful Improvements in Priming Compositions; and I do hereby declare the following to be a full, clear, and exact description of the invention, such as will enable others skilled in the art to which it appertains, to make and use the same.

The present invention relates to priming compositions for igniting explosive charges.

Priming materials as now made may be generally classified into two classes, namely, those containing fulminate of mercury, and those which do not contain fulminate of mercury. Priming compositions of both classes usually contain sensitizing substances to increase the sensitiveness of the primer. For example, a typical primer containing fulminate of mercury may be composed of fulminate of mercury, potassium chlorate, antimony sulfide and ground glass. The antimony sulfide and the ground glass act as sensitizing agents, and it has commonly been considered necessary to use antimony sulfide, or both antimony sulfide and a material such as glass, for giving the desired sensitiveness to the composition; since, however, they are not only inactive, but even act as retarders, they operate to diminish the power of the primer.

One of the objects of this invention, therefore, is to provide a priming composition in which the sensitizer is an active one, and more particularly one that is endothermic, so that it evolves heat and thus increases the violence of the explosion and adds to the heat released.

The present invention is based upon the discovery that the sensitiveness of fulminate, as well as of non-fulminate, priming composition can be increased by incorporating therein a hard crystalline substance which is endothermic. Such a substance is ferro-silicon, which is not only hard and crystalline and, therefore, has the structure necessary for a sensitizer, but it is an endothermic substance since heat is absorbed in its formation. Accordingly it imparts other desirable and advantageous properties to the priming compositions because of its high heat of formation which results in a large increase in the heat released during the explosion or ignition and which likewise increases the volume and intensity of the gases produced by the ignition of the priming material.

Where ferro-silicon is employed in the priming composition, this material forms a desirable and advantageous addition, even where, for example, antimony sulfide and ground glass are also used and will impart to such compositions increased sensitiveness and increased heat upon ignition, etc. I have found, however, that by the incorporation of ferro-silicon in priming compositions, the usual sensitizing ingredients can be greatly reduced or even omitted entirely. For example, by incorporating ferro-silicon in fulminate priming compositions, such as those above described, both ground glass and antimony sulfide can be eliminated, thus eliminating two of the ingredients of the composition which are undesirable as ingredients of priming mixtures, but which have heretofore been commonly used.

Where the priming composition contains other sensitizing agents such as antimony sulfide or antimony sulfide and ground glass, the composition will nevertheless be improved, as above pointed out, by the presence of the added ferro-silicon; but even without sensitizing agents such as antimony sulfide or ground glass, the priming composition containing the ferro-silicon is notwithstanding an advantageous composition with an appropriate degree of sensitiveness and with the added advantage of increased heat production and increased volume and intensity of the gases produced by the ignition of the priming composition. The action of these gases not only promotes the ignition of the main explosive charge, but it supplements and increases the action of the gases resulting from the ignition of the explosive charge itself.

When ferro-silicon is added to the priming composition containing antimony sulfide, or antimony sulfide and ground glass, the amount of ferro-silicon added can be varied, and the amounts of antimony sulfide and of ground glass can be reduced in amount from the amounts commonly used. When the ferro-silicon is used without antimony sulfide and ground glass or like materials, the amount of the ferro-silicon can similarly be varied.

For example, the priming composition can be made of a mixture of fulminate of mercury, potassium chlorate and ferro-silicon in the following proportions:

|   | Per cent. |
|---|---|
| Fulminate of mercury | 25 to 45 |
| Potassium chlorate | 20 to 45 |
| Ferro-silicon | 25 to 30 |

In some cases it may be desirable to use a smaller quantity of ferro-silicon and a larger quantity of the other ingredients.

The invention is also applicable to priming compositions which contain no fulminate of mercury but which contain other materials suitable for producing ignition, that is, which are sufficiently sensitive to ignite under the friction imparted by the blow of the firing pin of the arm in which the ammunition is fired. It is also applicable to priming compositions which contain both fulminate of mercury and such other materials. When used with non-fulminate priming compositions, or compositions which contain both fulminate of mercury and other materials, the ferro-silicon imparts similar advantages to the composition to those above mentioned, that is, it acts as a sensitizer and gives increased heat and consequently increased volume and intensity of the gases produced by the ignition of the priming composition.

The following is a typical formula of another type of priming composition illustrating the invention, in which both fulminate of mercury and other materials are used:

|   | Per cent. |
|---|---|
| Potassium chlorate | 36 |
| Lead sulfo-cyanate | 24 |
| Fulminate of mercury | 12 |
| Ferro-silicon | 28 |

The following typical examples of non-fulminate compositions will further illustrate the invention. A part only of the antimony sulfide of such compositions may be replaced by ferro-silicon, as in the following example:

|   | Per cent. |
|---|---|
| Potassium chlorate | 53 |
| Antimony sulphide | 10 |
| Ferro-silicon | 7 |
| Lead sulfocyanate | 25 |
| Trinitrotoluene | 5 | or all of the antimony sulfide may be replaced, as illustrated by the following formula:

|   | Per cent. |
|---|---|
| Potassium chlorate | 53 |
| Ferro-silicon | 17 |
| Lead sulfocyanate | 25 |
| Trinitrotoluene | 5 |

The following example also illustrates a composition which contains no antimony sulfide:

|   | Per cent. |
|---|---|
| Potassium chlorate | 35 |
| Lead sulfocyanate | 25 |
| Ferro-silicon | 25 |
| Hexanitrodiphenylamine | 15 |

It will be understood that the typical formulas or examples given are intended to be illustrative of the invention, and that other priming compositions can be similarly made which differ from the specific examples given above, where the ferro-silicon is used in place of the sensitizing ingredients which such compositions usually contain, or where it is used in addition to certain of said sensitizing ingredients. Ferro-silicon can thus be used in connection with priming compositions containing brizant explosive material such as lead azid or similar azides; tetranitraniline, tetranitromethylaniline, trinitroresorcinate, hexanitrodiphenylamine, trinitrotoluene, picric acid, or combinations of these and similar ingredients capable of detonation.

I claim:

1. A priming composition containing an initiator and an endothermic sensitizer.

2. A priming composition containing an initiator and an endothermic sensitizer which is hard and crystalline.

3. A priming composition containing an initiator and ferro-silicon.

4. A priming composition containing fulminate of mercury and potassium chlorate and having sensitiveness imparted thereto by ferro-silicon.

In testimony whereof I affix my signature.

JOHN MERRILL OLIN.